US004001643B2

United States Statutory Invention Registration [19]

[11] Reg. Number: H1643

Hay

[45] Published: Apr. 1, 1997

[54] DUCTILE METAL LIGAMENT FIBER COATINGS FOR CERAMIC COMPOSITES

[75] Inventor: Randall S. Hay, Beavercreek, Ohio

[73] Assignee: The United States of America as represented by the Secretary of the Air Force, Washington, D.C.

[21] Appl. No.: 637,338

[22] Filed: Apr. 10, 1996

[51] Int. Cl.[6] ..... C04B 35/03

[52] U.S. Cl. ..... 501/95

[58] Field of Search ..... 501/95

*Primary Examiner*—Charles T. Jordan
*Assistant Examiner*—Meena Chelliah
*Attorney, Agent, or Firm*—Charles E. Bricker; Thomas L. Kundert

[57] ABSTRACT

An improved method for fabricating ceramic composites, particularly single crystal alumina fiber and yttrium-aluminum garnet (YAG) matrix composites. The method of this invention comprises the steps of (a) coating the fiber with a metal which is stable under oxidizing conditions, such as Pd, (b) coating the metal-coated fiber with a fugitive phase, such as Mo, (c) incorporating the coated fiber into a matrix material, (d) densifying the fiber-matrix into a composite and (e) heat treating the composite under oxidizing conditions to remove the fugitive phase.

5 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DUCTILE METAL LIGAMENT FIBER COATINGS FOR CERAMIC COMPOSITES

RIGHTS OF THE GOVERNMENT

The invention described herein may be manufactured and used by or for the Government of the United States for all governmental purposes without the payment of any royalty.

This invention relates to a ceramic composite material composed of a refractory fiber reinforcement and a ceramic matrix.

In general, ceramics have superior high-temperature strength and modulus, lower density, and lower thermal conductivity than metallic materials. The principal disadvantages of ceramics as structural materials are their relatively low failure strain, low fracture toughness and catastrophic brittle failure characteristics. Because of these intrinsic limitations, monolithic ceramics lack the properties of reliability and durability that are necessary for structural design acceptance. However, by incorporating high strength, relatively high modulus fibers into brittle ceramic matrices, high strength/high toughness composites can be obtained. Successfully tailored ceramic-matrix composites exhibit highly non-linear stress-strain behavior with ultimate strengths, failure strains and fracture toughnesses substantially greater than that of the unreinforced matrix.

It is well known that in order to exploit the benefits of fiber-reinforced ceramic-matrix composites, a relatively weak fiber/matrix interfacial bond strength is necessary to prevent catastrophic failure from propagating matrix cracks. The interface must provide sufficient fiber/matrix bonding for effective load transfer, but must be weak enough to debond and slip in the wake of matrix cracking while leaving the fibers to bridge the cracks and support the far-field applied load. Currently available fiber coatings such as carbon and boron nitride have demonstrated the desired mechanical characteristics necessary to enhance the composite strength and toughness, however the utility of these composites are severely limited by their susceptibility to oxidation embrittlement and strength degradation when stressed at or beyond the matrix cracking stress point and subsequently exposed to high-temperature oxidation. This fundamental limitation is due to the accelerated environmental degradation of the fiber coating at elevated temperatures in air following the onset of matrix cracking.

For air-breathing engines, fiber coatings must be oxidation resistant, stable with the fiber and matrix, and function over a wide temperature range. Several oxidation-resistant fiber coatings have been proposed as alternatives to carbon and boron nitride. Fugitive coatings involving application of graphite or a refractory metal that forms a volatile oxide, such as molybdenum or tungsten, are one such proposal. The composites are densified in a reducing atmosphere and then heat-treated in an oxidizing atmosphere, leaving void space where there once was coating. Ductile coatings of a refractory noble metal have been proposed. Cleavable coatings of a refractory oxide such as beta-alumina are under consideration. Residual thermal stress and stress developed by reactions are also considerations.

A reinforcing fiber suitable for high temperature use must also be creep resistant. Although anisotropic, single crystal alumina is currently the most creep resistant oxide fiber commercially available. Ceramic composites made with these single crystal fibers and yttrium-aluminum garnet ($Y_3Al_5O_{12}$, YAG) matrices have been shown to be chemically stable. The CTE mismatch between these phases is small, but the anisotropy of thermal expansion in alumina causes residual stress of about 150 MPa (compressive) and about 60 MPa (tensile) to develop in the radial and axial directions, respectively, for c-axis alumina fibers in a YAG matrix.

I have found that single crystal alumina fiber and yttrium-aluminum garnet (YAG) matrix composites are improved by coating the fiber with a metal and a fugitive phase, prior to incorporating the fiber in the matrix.

Accordingly, it is an object of the present invention to provide an improved method for fabricating ceramic composites.

Other objects and advantages of the present invention will be apparent to those skilled in the art.

SUMMARY OF THE INVENTION

In accordance with the present invention there is provided an improved method for fabricating ceramic composites, particularly single crystal alumina fiber and yttrium-aluminum garnet (YAG) matrix composites. The method of this invention comprises the steps of (a) coating the fiber with a metal which is stable under oxidizing conditions, (b) coating the metal-coated fiber with a fugitive phase, (c) incorporating the coated fiber into a matrix material and (d) densifying the fiber-matrix into a composite.

DETAILED DESCRIPTION OF THE INVENTION

The ceramic reinforcing fibers employed herein may be single crystal alumina fiber (sapphire), polycrystalline alumina fiber, yttrium-aluminum garnet (YAG) fiber, polycrystalline YAG or directionally solidified YAG/alumina eutectic fibers.

The ceramic matrix comprises material selected from the group consisting of $Al_2O_3$, beta-aluminas, magnetoplumbites, yttrium-aluminum garnet ($Y_3Al_5O_{12}$, YAG), $MgAl_2O_4$, $Ca/ZrO_2$, $GdAlO_3$ and $Gd_3Al_5O_{12}$.

Metals suitable for use in the present invention include palladium, platinum, rhodium or any other metal which is stable under oxidizing conditions from room temperature or below to the maximum use temperature of the densified composite, i.e., up to about 1800° C. The metal can be used alone or alloyed with other metals, such as nickel, aluminum, chromium, iron or the like, so long as oxidation resistance is not severely compromised.

The fugitive phase can be any such fugitive phase known in the art, such as carbon or molybdenum.

The fiber/matrix composite can be fabricated using techniques known in the art. For example, a composite preform can be prepared by alternately layering a plurality of layers of fiber and matrix powder. The preform can then be pressureless-sintered at about 1700° C., and then hot-isostatically pressed at about 1700° C. with about 200 MPa applied pressure.

It is necessary that the fiber, coated with the metal and the fugitive phase, be incorporated with a suitable matrix into a composite under conditions that preserve the fugitive phase, such as reducing or inert gas conditions. After the composite is densified, the fugitive phase is removed by heat treatment in an atmosphere that causes the fugitive phase to volatilize, usually by forming a volatile oxide. Ligaments of the metal occupy the void space remaining. The ligaments should have a thickness ($\delta$), volume-percent metal, and metal composition such that the ductility of the metal ligaments relieves any compressive residual stress, and such that the toughness and strain to failure of the composite is optimized by promotion of crack deflection and fiber pullout along the metal ligament interface. Crack deflection and fiber pullout are usually associated with an interface that is weaker than the fiber or matrix by a factor of at least four. For example, of the refractory noble metals, palladium is the most ductile, platinum intermediate, and rhodium has very little ductility at room temperature. A desired ductility over a given temperature range can be achieved by forming alloys of these metals, and other metals, such as nickel, aluminum, chromium and iron, so long as oxidation resistance is not severely compromised. For a given metal composition, the ligament volume percent and thickness can be controlled to further optimize the mechanical properties of the fiber-matrix interface.

The following example illustrates the invention:

EXAMPLE

Fiber coating solutions were prepared by dissolving $PdCl_2$ in distilled water (90 g/l) and Mo powder in aqua regia (75 g/l). These solutions were mixed to provide a Pd:Mo mole ratio of 40:60. The mixed solutions was applied to Saphikon® continuous single crystal alumina fiber using a vertical continuous fiber coater, such as that disclosed by Hay et al, U.S. Pat. No. 5,217,533.

The fibers were coated five times with the 40:60 mixture in air at 1100° C. at 10 cm/s. The coated fibers were laid up into tapes and vacuum hot pressed with 1 μm Ceralox® YAG powder in a 1¼-inch square graphite die at 1600°–1700° C. and 25 MPa. The fiber volume fraction was about 5 volume percent. Higher densities were achieved when the composite was cold pressed at 20 MPa and held at that pressure to about 1000° C. No pressure was applied during rapid heat up (5 min) between 1000° and 1500° C. 25 MPa pressure was re-applied at 1500° C. up to final temperature.

The fiber-matrix interface in the hot pressed composites was observed by SEM and analytical TEM. Separate Mo and Pd grains were found in a continuous interlayer 0.5–2.0 μm thick along the fiber-matrix interface. No evidence of alloying was found. The samples were heat-treated in air between 1400° and 1600° C. for up to 100 hours, then characterized by optical microscopy, SEM and analytical TEM. In all cases, the Mo had been oxidized away, leaving isolated Pd grains and void space behind.

Various modifications may be made in the instant invention without departing from the spirit and scope of the appended claims.

I claim:

1. An improved method for fabricating ceramic composites of ceramic reinforcing fiber and ceramic matrix, which comprises the steps of (a) coating the fiber with a metal which is stable under oxidizing conditions from about room temperature to about 1800° C., (b) coating the metal-coated fiber with a fugitive phase, (c) incorporating the coated fiber into a matrix material, (d) densifying the fiber-matrix into a composite and (e) heat treating the composite under oxidizing conditions to remove the fugitive phase.

2. The method of claim 1 wherein said metal is selected from the group consisting of palladium, platinum and rhodium.

3. The method of claim 1 wherein said fugitive phase is carbon or molybdenum.

4. The method of claim 1 wherein said fiber is continuous single crystal alumina fiber.

5. The method of claim 1 wherein said matrix is yttrium-aluminum garnet.

* * * * *